US007269450B2

(12) United States Patent
Lee et al.

(10) Patent No.: US 7,269,450 B2
(45) Date of Patent: Sep. 11, 2007

(54) SLIDING/SWING-TYPE PORTABLE DIGITAL COMMUNICATION APPARATUS

(75) Inventors: Yang-Jic Lee, Seoul (KR); Jong-Seong Lee, Seoul (KR); Hun-Jong Jeong, Seoul (KR); Taig-Jong Yoo, Gunpo-si (KR)

(73) Assignee: Samsung Electronics Co., Ltd. (KR)

( * ) Notice: Subject to any disclaimer, the term of this patent is extended or adjusted under 35 U.S.C. 154(b) by 77 days.

(21) Appl. No.: 10/930,078

(22) Filed: Aug. 31, 2004

(65) Prior Publication Data

US 2005/0078443 A1  Apr. 14, 2005

(30) Foreign Application Priority Data

Oct. 9, 2003 (KR) .................. 10-2003-0070303
Dec. 26, 2003 (KR) .................. 10-2003-0097477

(51) Int. Cl.
  *H04M 1/00* (2006.01)
  *H04M 9/00* (2006.01)
(52) U.S. Cl. ............... 455/575.1; 455/575.4; 455/575.8; 379/433.12; 379/433.13; 379/433.11
(58) Field of Classification Search ......... 455/575.1, 455/575.4, 575.8; 379/433.12, 433.13, 433.11
  See application file for complete search history.

(56) References Cited

U.S. PATENT DOCUMENTS 5,689,240 A * 11/1997 Traxler ............... 340/573.4
6,308,084 B1 * 10/2001 Lonka ................. 455/556.1
7,050,767 B2 * 5/2006 Hickey et al. ......... 379/433.13
2003/0103041 A1 * 6/2003 Nguyen et al. ............ 345/168
2005/0054393 A1 * 3/2005 Fagerstrom et al. ...... 455/575.1
2005/0091431 A1 * 4/2005 Olodort et al. ............ 710/72
2006/0003817 A1 * 1/2006 Lee et al. ................ 455/575.3

FOREIGN PATENT DOCUMENTS

JP    2002057771 A  *  2/2002
JP    2002368860 A  *  12/2002
JP    2003037658 A  *  2/2003

OTHER PUBLICATIONS

Electronic Translations for JP2003-037658 and JP2002-368860.*
Electronic Tranalation for Japanese Publication No. 2002-057771.*

* cited by examiner

*Primary Examiner*—Lester G. Kincaid
*Assistant Examiner*—Marisol Figueroa
(74) *Attorney, Agent, or Firm*—The Farrell Law Firm (57) ABSTRACT

A sliding/swing-type portable digital communication apparatus including a main housing having a speaker unit positioned on its rear surface; key housings, each of which is positioned on a side of the main housing, the key housings being adapted to slide a predetermined distance toward or away from the main housing along a longitudinal direction for exposing or hiding the speaker unit according to whether or not the key housings have slid; and a swing housing adapted to rotate about a hinge axis, which is oriented perpendicular to the sliding direction of the key housings, within a predetermined range of angle while continuously facing an upper surface of the main housing and upper surfaces of the key housings for exposing and hiding predetermined areas of the key housings.

22 Claims, 9 Drawing Sheets

SLIDING/SWING-TYPE PORTABLE DIGITAL COMMUNICATION APPARATUS

PRIORITY

This application claims priority to applications entitled "A Sliding/Swing-Type Portable Digital Communication Apparatus" filed with the Korean Intellectual Property Office on Oct. 9, 2003 and Dec. 26, 2003, and assigned Ser. Nos. 2003-70303 and 2003-97477, the contents of which are hereby incorporated by reference.

BACKGROUND OF THE INVENTION

1. Field of the Invention

The present invention relates to portable digital communication apparatuses, such as cellular phones, PDAs (personal digital assistants), HHPs (hand held phones), and PCS (personal communication service) phones, and more particularly to portable digital communication apparatuses having housings capable of making sliding and swing movements with respect to each other.

2. Description of the Related Art

In general, a "portable communication apparatus" refers to an electronic apparatus which a user can carry with him/her to perform wireless communication with a desired partner. In consideration of portability, designs of such portable communication apparatuses have emphasized compactness, slimness, and lightness, as well as the availability of multimedia functions, and having a wider variety of services and functions. In particular, portable communication apparatuses being developed are expected to incorporate greater multi-functionality and multi-purpose utilization, and are expected to be more compact and lighter, while at the same time being suitable for various multimedia environments or Internet environments. Such portable communication apparatuses are now commonly used and are recognized as a nearly indispensable commodity which must always be carried.

Conventional portable communication apparatuses may be classified into various types according to their appearance, such as bar-type portable communication apparatuses, flip-type portable communication apparatuses, and folder-type portable communication apparatuses. The bar-type portable communication apparatus has a single housing shaped like a bar. The flip-type portable communication apparatus has a flip which is pivotably mounted to a bar-shaped housing by a hinge unit. The folder-type portable communication apparatus has a folder coupled to a single bar-shaped housing by a hinge unit in such a manner that the folder can be pivoted in order to be folded to or unfolded from the housing.

Further, portable communication apparatuses may be classified into neck wearable type communication apparatuses and wrist wearable type communication apparatuses according to the position at or the way in which a user puts on or carries the communication apparatus. The neck wearable type communication apparatus is one which a user wears around the neck using a string or lanyard, while the wrist wearable type communication apparatus is one which a user wears around the wrist.

Additionally, portable communication apparatuses may be classified into rotation-type communication apparatuses and sliding-type communication apparatuses according to ways of opening and closing the communication apparatuses. In the rotation-type portable communication apparatus, two housings are coupled to each other in such a manner that one housing rotates to be opened or closed relative to the other while the housings face each other. In the sliding-type portable communication apparatus, two housings are coupled to each other in a manner that one housing slides to be opened or closed relative to the other. These variously classified portable communication apparatuses can be easily understood by those skilled in the art.

Meanwhile, conventional portable communication apparatuses are now generally equipped with a function of transmitting data at a high speed in addition to the basic function of performing voice communication. In other words, according to an increase in demand by consumers, portable communication apparatuses now can provide services using a wireless communication technology capable of transmitting data at a high speed.

Recent portable communication apparatuses now may be equipped with a camera lens which enables each of the communication apparatuses to transmit an image signal. That is, current conventional portable communication apparatuses may have an imbedded or external camera lens or a photographing means which enables a user to make an image communication with a desired partner or to take a photograph of a desired subject.

However, conventional portable communication apparatuses, in particular sliding-type portable communication apparatuses are sometimes inconvenient to use with respect to their key operations when they are used in an e-mail transmission mode, in a chatting mode, or in a PDA mode. This is due to the relatively small number of key arrays which may make it difficult to perform complex data input operations.

SUMMARY OF THE INVENTION

Accordingly, the present invention has been made to solve the above-mentioned problems occurring in the prior art, and an object of the present invention is to provide a portable digital communication apparatus having a number of key arrays conveniently positioned to guarantee quickness, correctness, and ease in key operations, in particular in key pressing, while enabling the user to use both hands.

Another object of the present invention is to provide a portable digital communication apparatus, which includes housings capable of smoothly sliding with respect to each other.

Still another object of the present invention is to provide a portable digital communication apparatus which has a camera lens protected from the outside.

In order to accomplish these objects, there is provided a sliding/swing-type portable digital communication apparatus including a main housing having a speaker unit positioned on a rear surface; key housings, each of which is positioned on a side of the main housing, the key housings being adapted to slide a predetermined distance toward or away from the main housing along a longitudinal direction for exposing or hiding the speaker unit according to whether or not the key housings have been slid; and a swing housing adapted to rotate about a hinge axis, which is oriented perpendicular to a sliding direction of the main housing, within a predetermined angle range while continuously facing an upper surface of the main housing and upper surfaces the key housings for exposing and hiding predetermined areas of the key housings.

In accordance with another aspect of the present invention, there is provided a sliding/swing-type portable digital communication apparatus including a main housing having a battery pack positioned on a lower surface, a camera lens positioned adjacent to one side the battery pack, and a locking knob positioned adjacent to another side of the battery pack; a pair of key housings, each of which is positioned on each of opposite sides of the main housing, the key housings being adapted to slide a predetermined distance toward or away from the main housing along a longitudinal direction for exposing and hiding the camera lens housing; and a swing housing adapted to rotate about a hinge axis, which is oriented perpendicular to a sliding direction of the main housing, within a predetermined angle range while continuously facing an upper surface of the main housing and upper surfaces of the pair of key housings for exposing and hiding predetermined areas of the pair of key housings.

In accordance with still another aspect of the present invention, there is provided a sliding/swing-type portable digital communication apparatus including a main housing having a battery pack positioned on a lower surface; key housings, each of which is positioned on each of opposite sides of the main housing, the key housings being adapted to slide a predetermined distance toward or away from the main housing along a longitudinal direction; a swing housing adapted to rotate about a hinge axis, which is oriented perpendicular to a sliding direction of the main housing, within a predetermined angle range while continuously facing an upper surface of the main housing and upper surfaces of the key housings for exposing and hiding predetermined areas of the key housings; and a set of key arrays, provided on the upper surfaces of the key housings, including a first key array composed of a number of keys adapted to be visually exposed after sliding the key housings; a second key array composed of a number of keys adapted to be visually exposed after rotation of the swing housing; and a third key array composed of a number of keys adapted to be visually exposed after both rotation of swing housing and sliding of the key housings.

In accordance with yet another aspect of the present invention, there is provided a portable digital terminal including a main housing having a battery pack positioned on a rear surface; first and second key housings, each of which is positioned on each of opposite sides of the main housing, one of the key housings being adapted to slide within a predetermined distance range toward or away from the other along a longitudinal direction of the main housing; and a driving means adapted to cause the other key housing to slide, according to a sliding of the one key housing, wherein the driving means includes: a rack gear positioned on a bottom surface of one of the first and second key housings along a longitudinal direction while facing the main housing; a pinion gear rotatably positioned in the main housing to engage and rotate with the rack gear; a driving pulley rotatably positioned in the main housing, the driving pulley having a drive gear on its end for engaging the pinion gear; and a driving belt positioned in the main housing, the driving belt being adapted to convert a rotational movement of the driving pulley into a linear reciprocating movement and being adapted to transmit it to the other key housing.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention unclear.

As shown in FIGS. 1 to 6, a portable digital communication apparatus according to the present invention comprises: a main housing 100; key housings 110, 120, each of which is positioned on a side of the main housing, the key housings being adapted to slide a predetermined distance toward or away from the main housing 100 along its longitudinal direction; and a swing 200 housing adapted to rotate about a hinge axis, which is oriented perpendicular to the sliding direction of the key housings 110 and 120, within a predetermined angle while continuously facing the upper surface 100a of the main housing 100 and the upper surfaces 110a, 120a of each of the key housings 110, 120 for exposing and hiding predetermined areas of the key housings 110, 120. The second key housing 120 faces the first key housing 110 symmetrically with respect to main housing 100.

Figure 5:
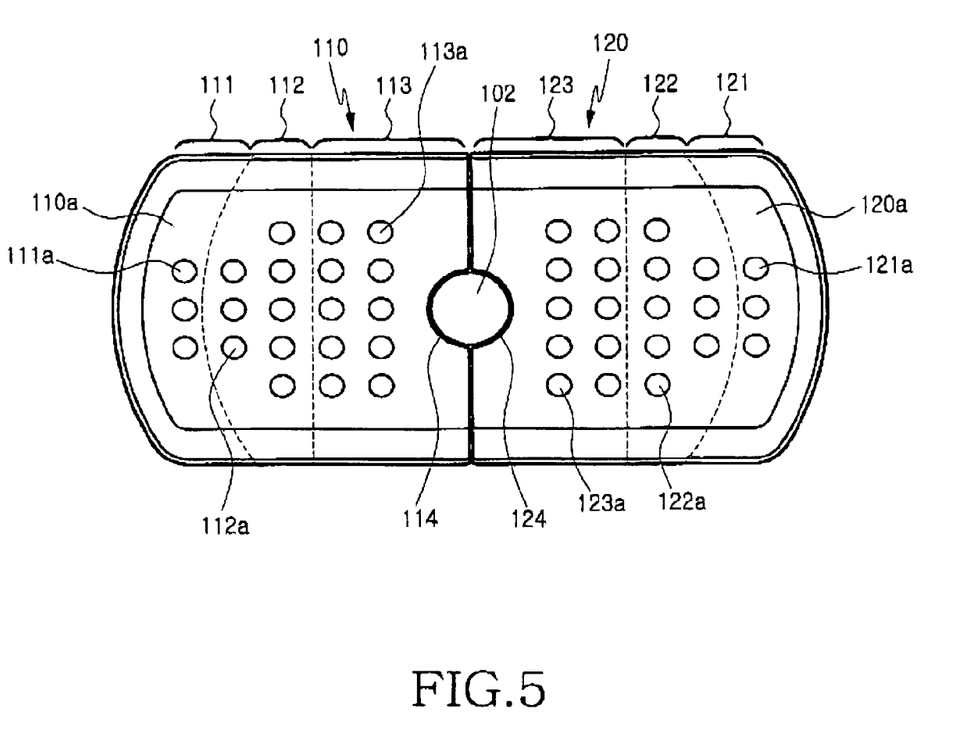
FIG. 5 is a front view showing a portable digital communication apparatus according to a preferred embodiment of the present invention wherein its key housings are closed on its main housing.
Figure 6:
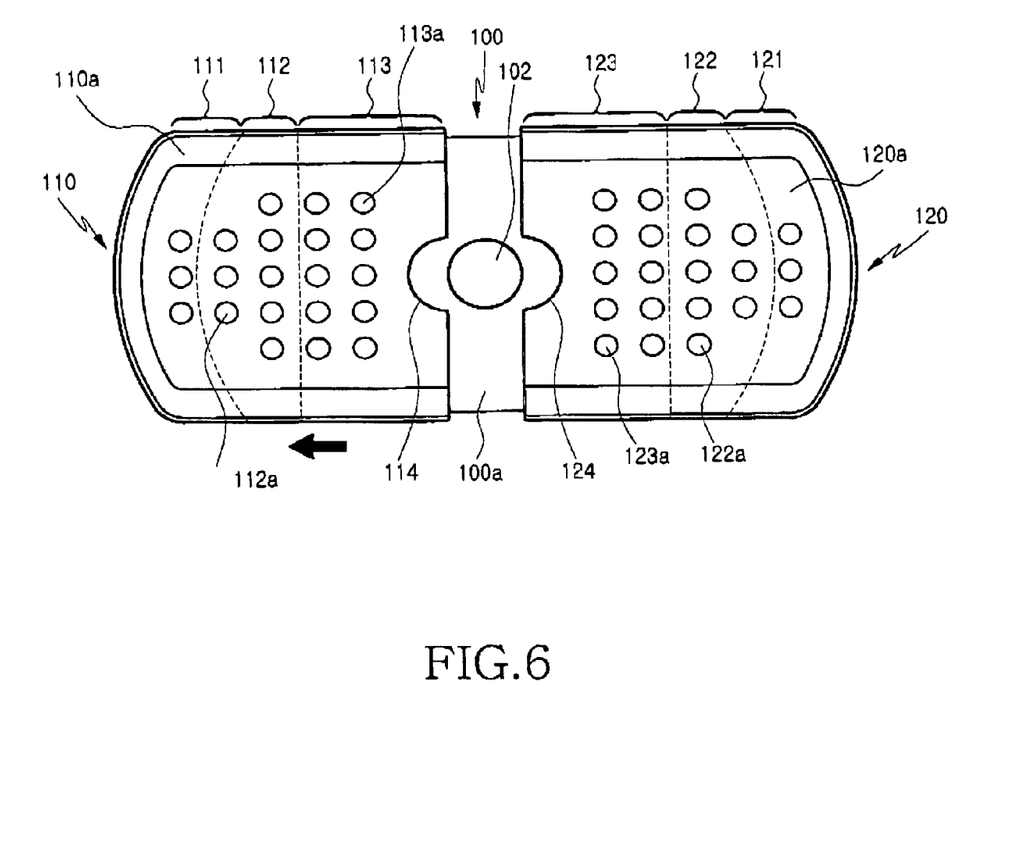
FIG. 6 is a front view of the apparatus shown in FIG. 5 wherein the key housings are opened after a sliding.

As shown in FIGS. 5 and 6, the first key housing 110 is provided with, on its upper surface 110a, a first key array 111 composed of a number of keys 111a which are visually exposed after sliding the first key housing 110; a second key array 112 composed of a number of keys 112a visually to exposed after a rotation of the swing housing 200; and a third key array 113 composed of a number of keys 113a visually exposed after both rotation of swing housing 200 and sliding of first key housing 110.

The first key array 111 is disposed adjacent to the second key array 112, the second key array 112 is disposed adjacent to the third key array 113, and the first, second, and the third key arrays 111, 112, 113 are arranged on the upper surface 110a of the first key housing 110.

In the preferred embodiment, the number of keys 111a composing the first key array 111 is smaller than the number of keys 112a composing the second key array 112, while the number of keys 112a composing the second key array 112 is smaller than the number of keys 113a composing the third key array 113.

The second key housing 120 is provided with, on its upper surface 120a, a first key array 121 composed of a number of keys 121a visually exposed after sliding the second key housing 120; a second key array 122 composed of a number of keys 122a visually exposed after rotation of swing housing 200; and a third key array 123 composed of a number of keys 123a visually exposed after both rotation of swing housing 200 and sliding of second key housing 120.

The first key array 121 of the second key housing 120 is disposed adjacent to the second key array 122, the second key array 122 is disposed adjacent to the third key array 123, and the first, second, and the third key arrays 121, 122, 123 are arranged on the upper surface 120a of the first key housing 120.

The number of keys 121a composing the first key array 121 of the second key housing 120 is smaller than the number of keys 122a composing the second key array 122, while the number of keys 122a composing the second key array 122 is smaller than the number of keys 123a composing the third key array 123.

Preferably, the second key housing 120 is provided with openings 125, 126 for a speaker unit on its rear surface 120b. The openings 125, 126 for the speaker unit form a pair and face each other, as shown in FIG. 4.

Referring again to FIGS. 5 and 6, hinge openings 114, 124 are formed on each of the facing ends of the first and second key housings 110, 120 for mounting a hinge module (not shown) and another hinge opening 102 is formed on the upper surface 100a of the main housing 100 for coupling with the hinge module (not shown).

As shown, the first and second key housings 110, 120 are adapted to move linearly.

Figure 2:
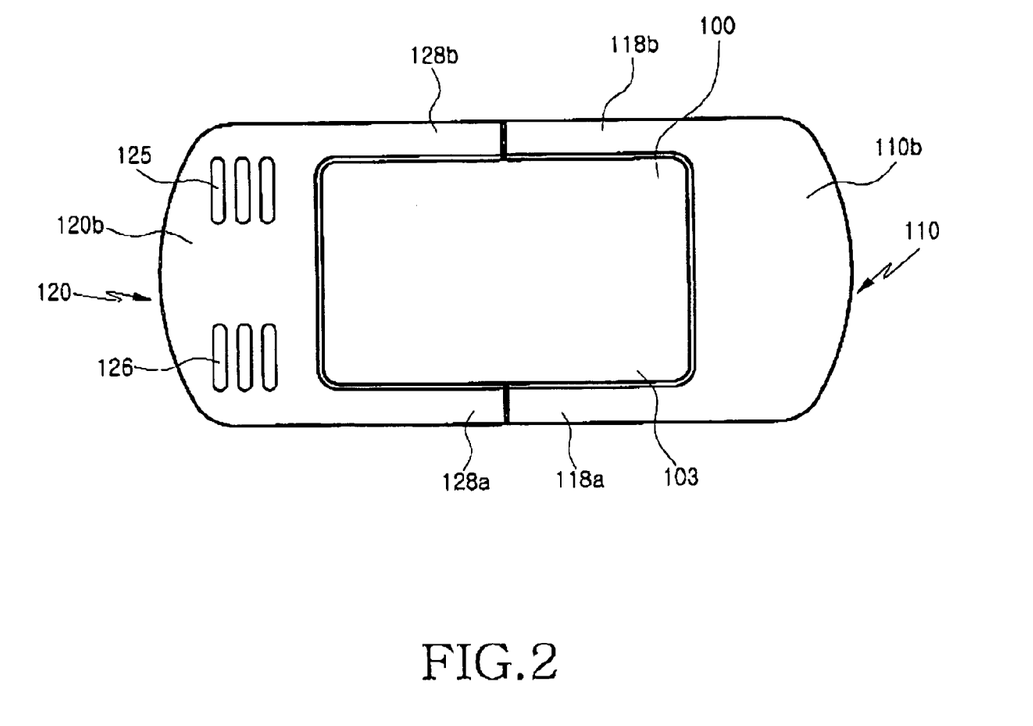
FIG. 2 is a rear view of the portable digital communication apparatus shown in FIG. 1.
Figure 4:
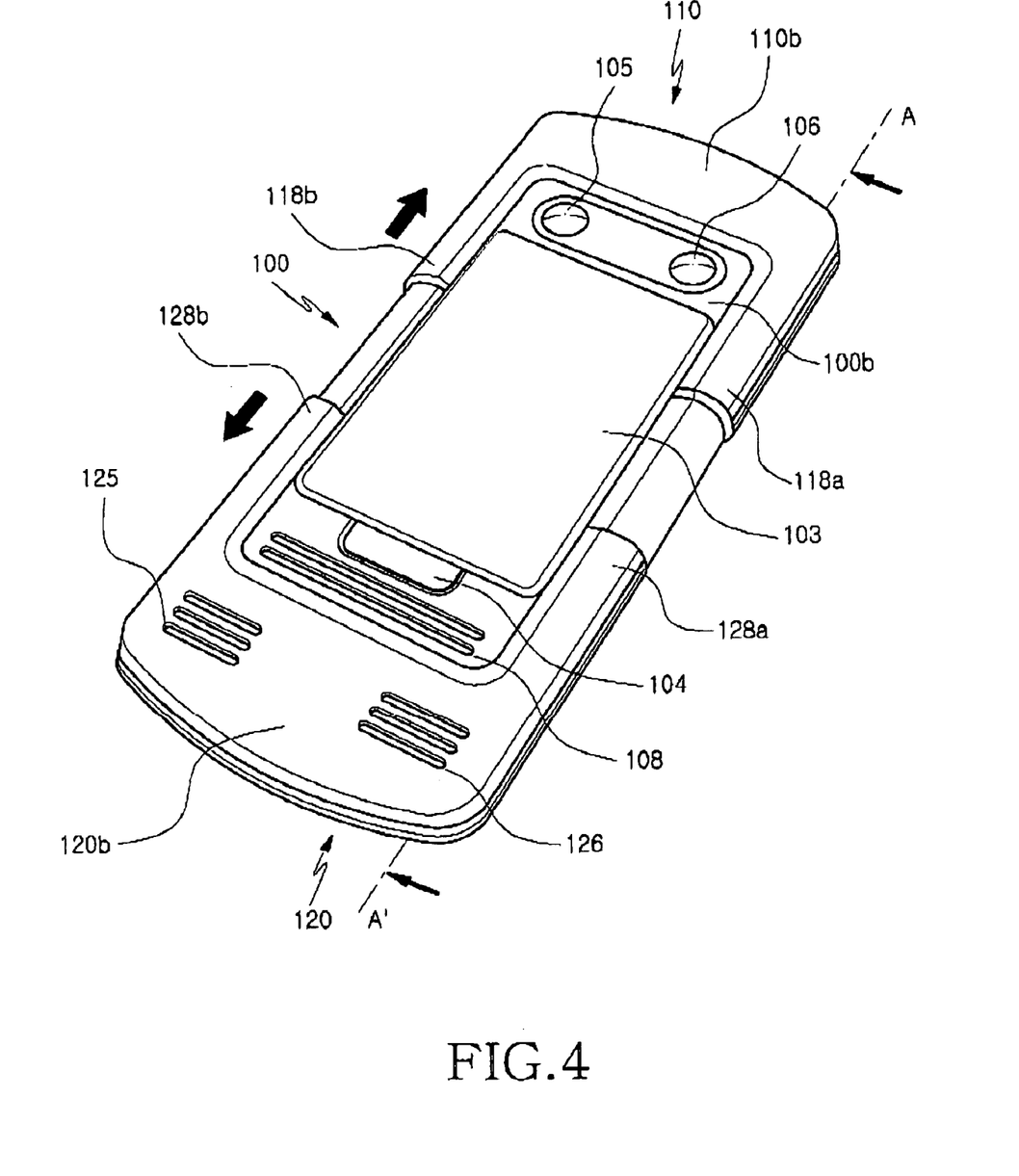
FIG. 4 is a perspective view showing rear portions of a portable digital communication apparatus according to a preferred embodiment of the present invention after sliding of its key housings.

As shown in FIGS. 2 and 4, the main housing 100 is provided with, on its rear surface 100b, a battery pack 103, a camera lens 105 positioned next to a side of the battery pack 103, as well as a locking knob 104 and a speaker unit 108, both of which are positioned next to the other side of the battery pack 103. Also, a reflective plate, in particular a mirror 106 is positioned proximate to the camera lens 105. In other words, on the rear surface 100b of the main housing, the camera lens 105 is disposed adjacent to the battery pack 103, the battery pack 103 is disposed adjacent to the speaker unit 108, and the battery pack 103 is also disposed adjacent to the mirror 106.

The speaker unit 108 and the locking knob 104 are exposed or hidden according to whether the second key housing 120 has been slid or not. Specifically, when the second key housing 120 has been slid open, as shown in FIG. 4, both the locking knob 104 and the speaker unit 108 are exposed. Similarly, the camera lens 105 and the mirror 106 are exposed or hidden according to whether the first key housing 110 has been slid or not. That is, when the first key housing 110 has been slid open, both the camera lens 105 and the mirror 106 are exposed. In addition, when the second key housing 120 is not moved but is kept closed, as shown in FIG. 2, the speaker unit 108 lies beneath and faces the openings 125, 126. In this state, any sound generated by the speaker unit 108 is transmitted to the outside via the openings 125, 126.

As shown in FIGS. 2 and 4, the first key housing 110 is provided with a pair of first holding portions 118a, 118b for smooth and correct sliding movements. The first holding portions 118a, 118b are adapted to slide along edges of the battery pack 103. The second key housing 120 is similarly provided with a pair of second holding portions 128a, 128b for smooth and correct sliding movements. The second holding portions 128a, 128b are also adapted to slide along edges of the battery pack 103.

The first and second holding portions 118a, 118b and 128a, 128b preferably have the same configuration and are positioned symmetrically. They are also adapted to move toward or away from each other.

Figure 1:
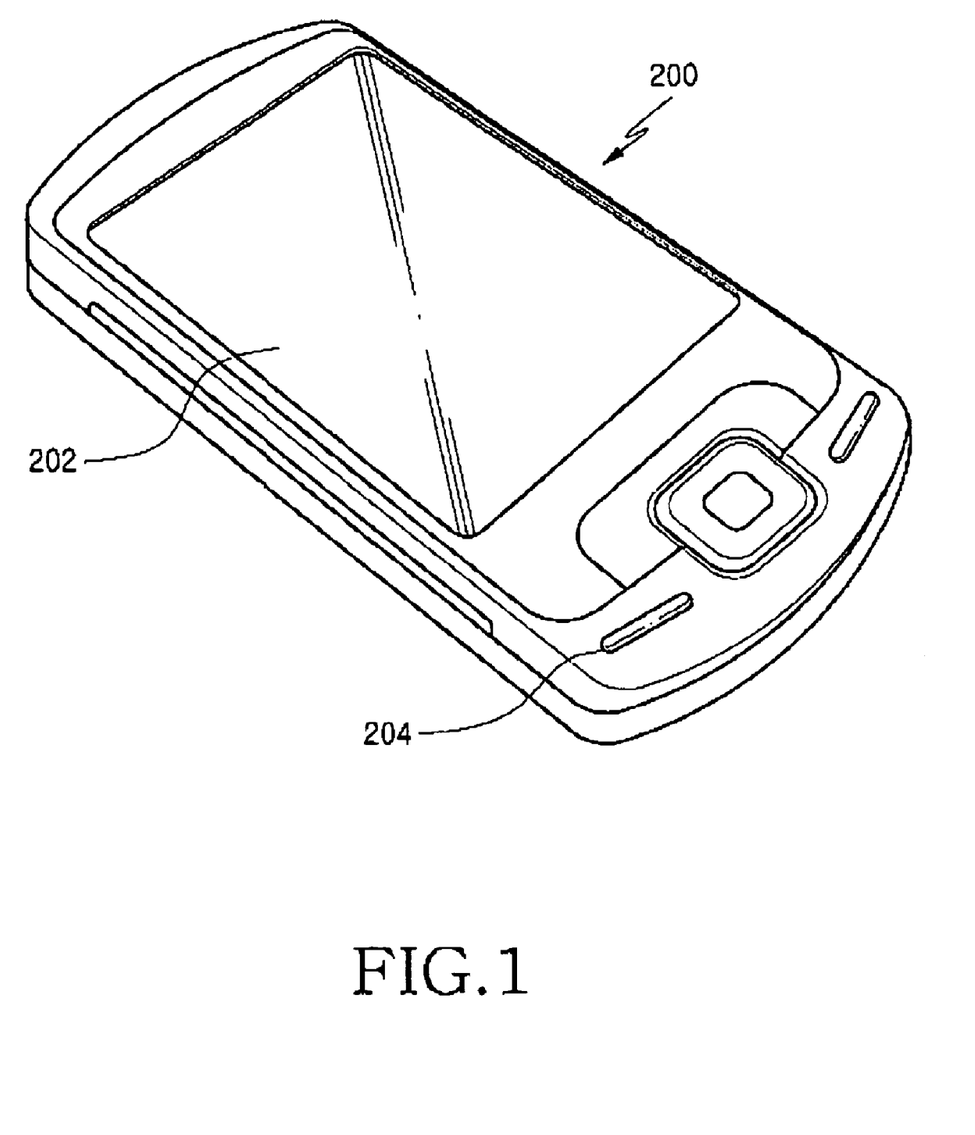
FIG. 1 is a perspective view showing a portable digital communication apparatus according to a preferred embodiment of the present invention.
Figure 3:
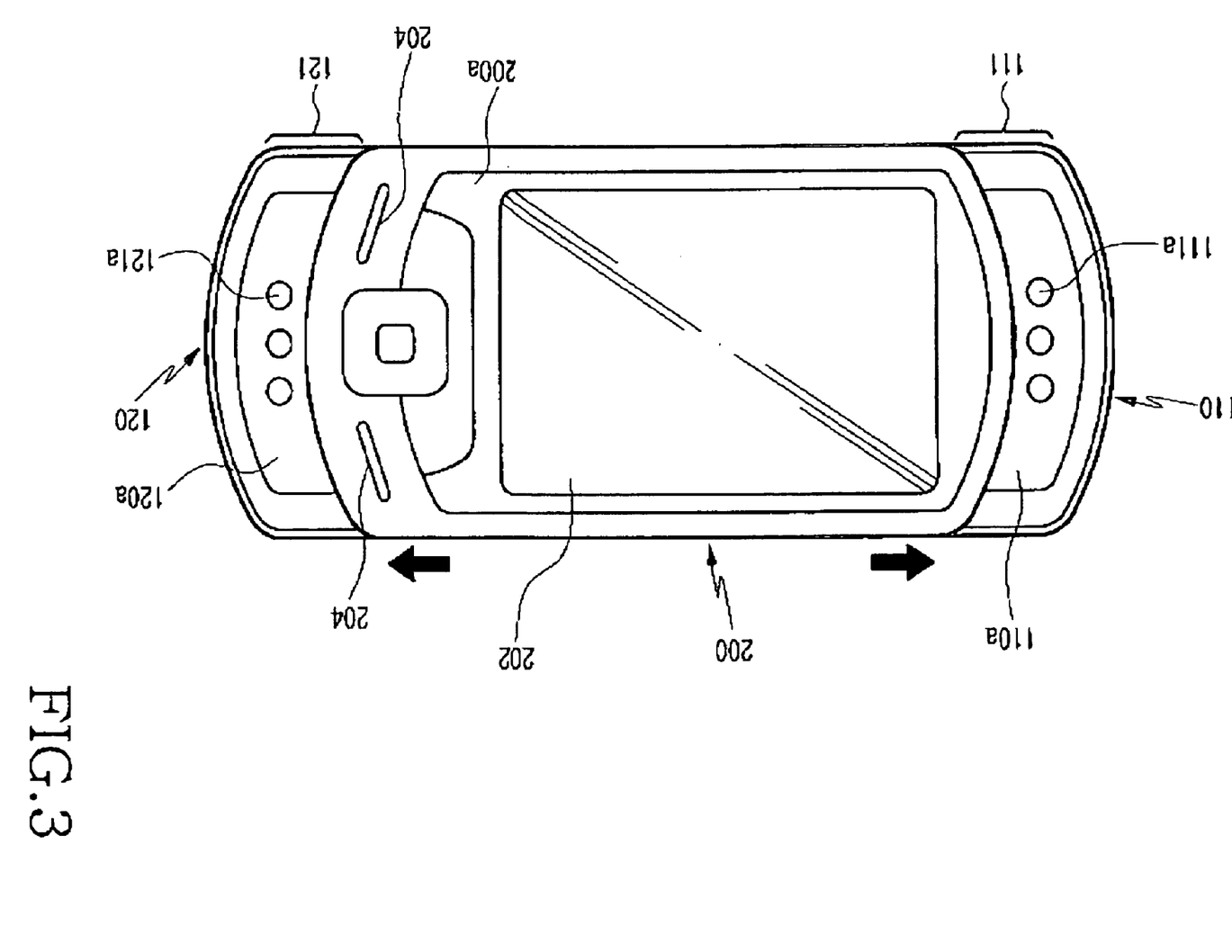
FIG. 3 is a front view showing a portable digital communication apparatus according to a preferred embodiment of the present invention after sliding of its key housings.

Referring to FIGS. 1 and 3, the swing housing 200 is provided with, on its upper surface 200a, a display unit 202 and a fourth key array 204 composed of a number of keys disposed adjacent to the display unit 202. The display unit 202 is preferably a touch screen, but may also be an LCD module or a hologram screen.

When the first and second key housings 110 and 120 have slid away from each other, as shown in FIG. 3, each of the first key arrays 111, 121 of the first and second key housings 110 and 120, the display unit 202, and the fourth key array 204 are disposed adjacent to one another.

Figure 7:
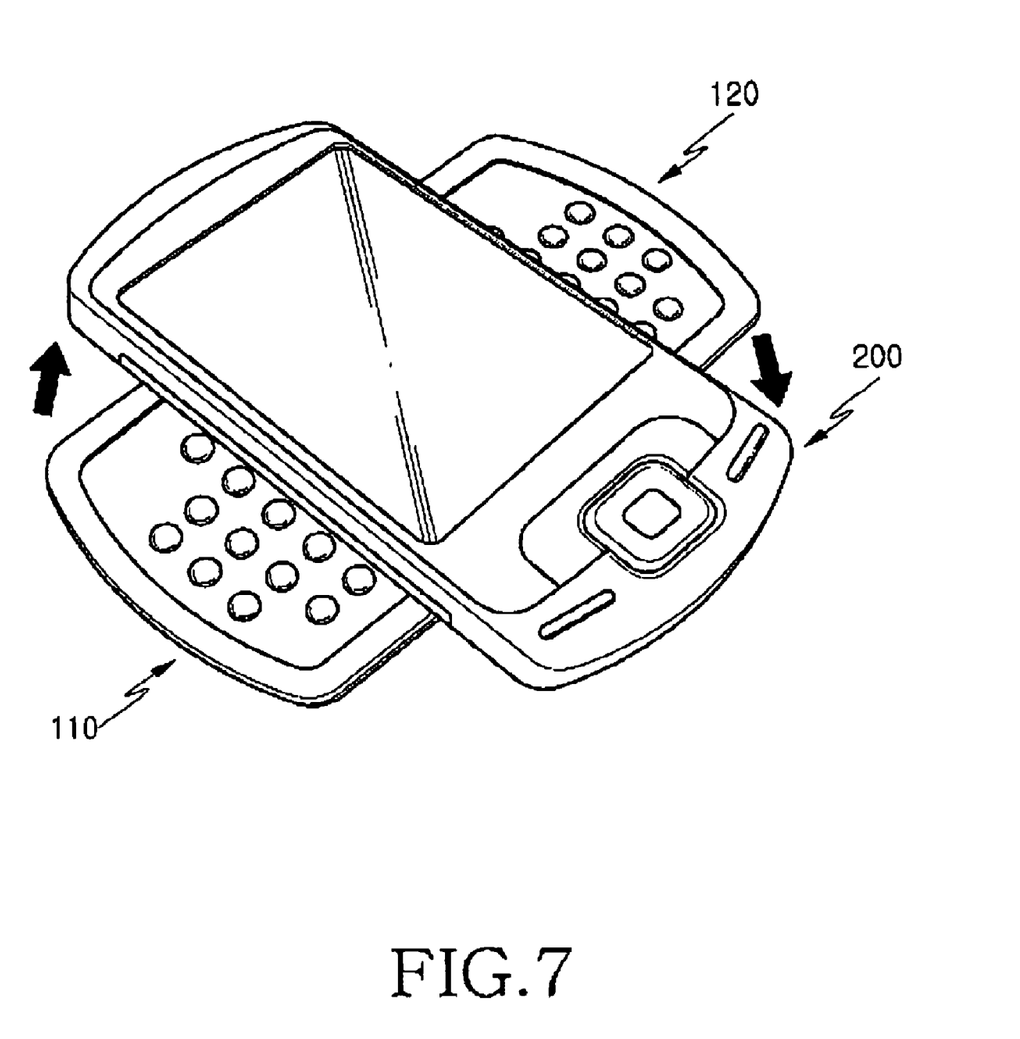
FIG. 7 is a perspective view showing a portable digital communication apparatus according to a preferred embodiment of the present invention wherein its swing housing has rotated about 90°.

When the swing housing 200 is rotated 90°, as shown in FIG. 7, each of the first key arrays 111, 121 of the first and second key housings 110 and 120 and the second key arrays 112, 122 are disposed adjacent to one another; and the second key arrays 112, 122 are disposed adjacent to the display unit 202.

Figure 8:
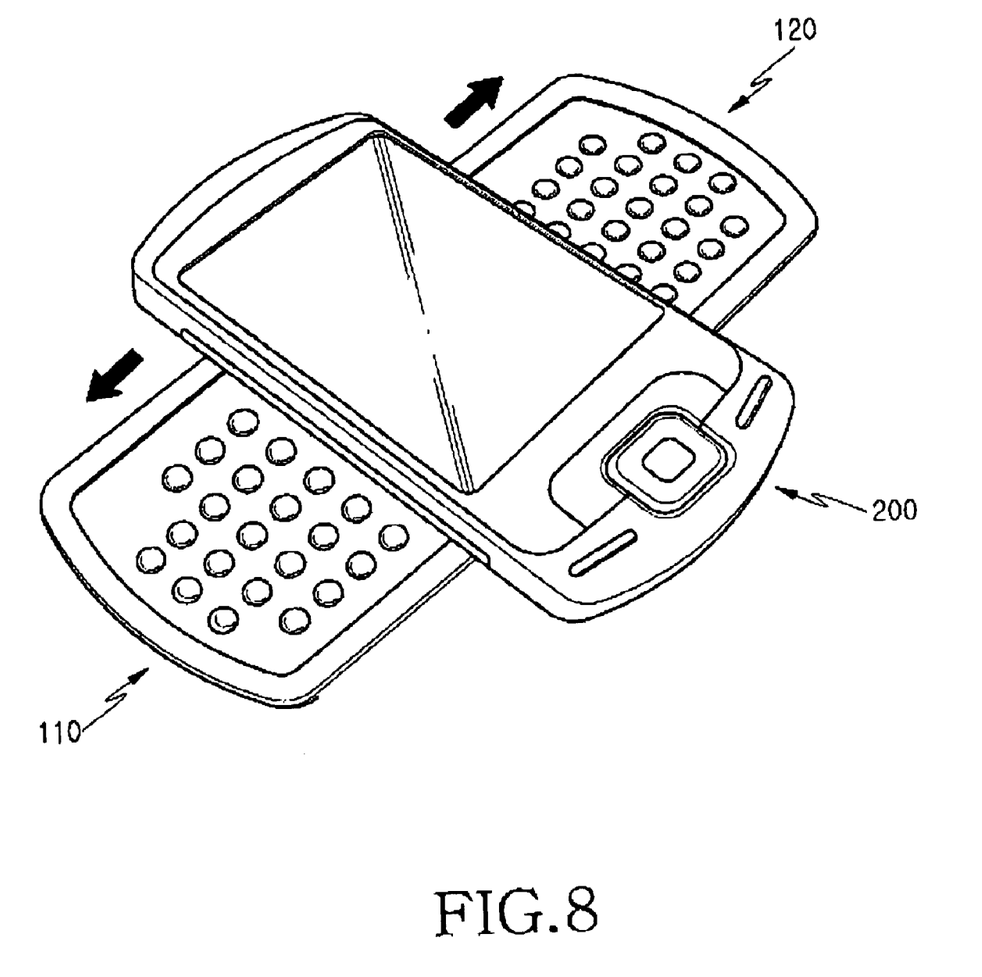
FIG. 8 is a perspective view showing a portable digital communication apparatus according to a preferred embodiment of the present invention wherein its swing housing has rotated about 90° and its key housings have slid away from each other.

When the swing housing 200 is rotated 90° and the first and second key housings 110 and 120 have slid away from each other, as shown in FIG. 8, each of the first key arrays 111, 121 of the first and second key housings 110 and 120 and the second key arrays 112, 122 are disposed adjacent to one another; each of the second key arrays 112, 122 are disposed adjacent to each of the third key arrays 113, 123; and each of the third key arrays 113, 123 are disposed adjacent to the display unit 202.

When the swing housing 200 is rotated about 90°, as shown in FIGS. 7 and 8, the first and second key housings 110 and 120 are disposed in a cross-shaped configuration together with the swing housing 200.

The portable digital communication apparatus may be provided with a driving means 300 for interlocking the sliding movements of the first and second key housings 110 and 120. The driving means 300 will now be described with reference to FIG. 9.

Figure 9:
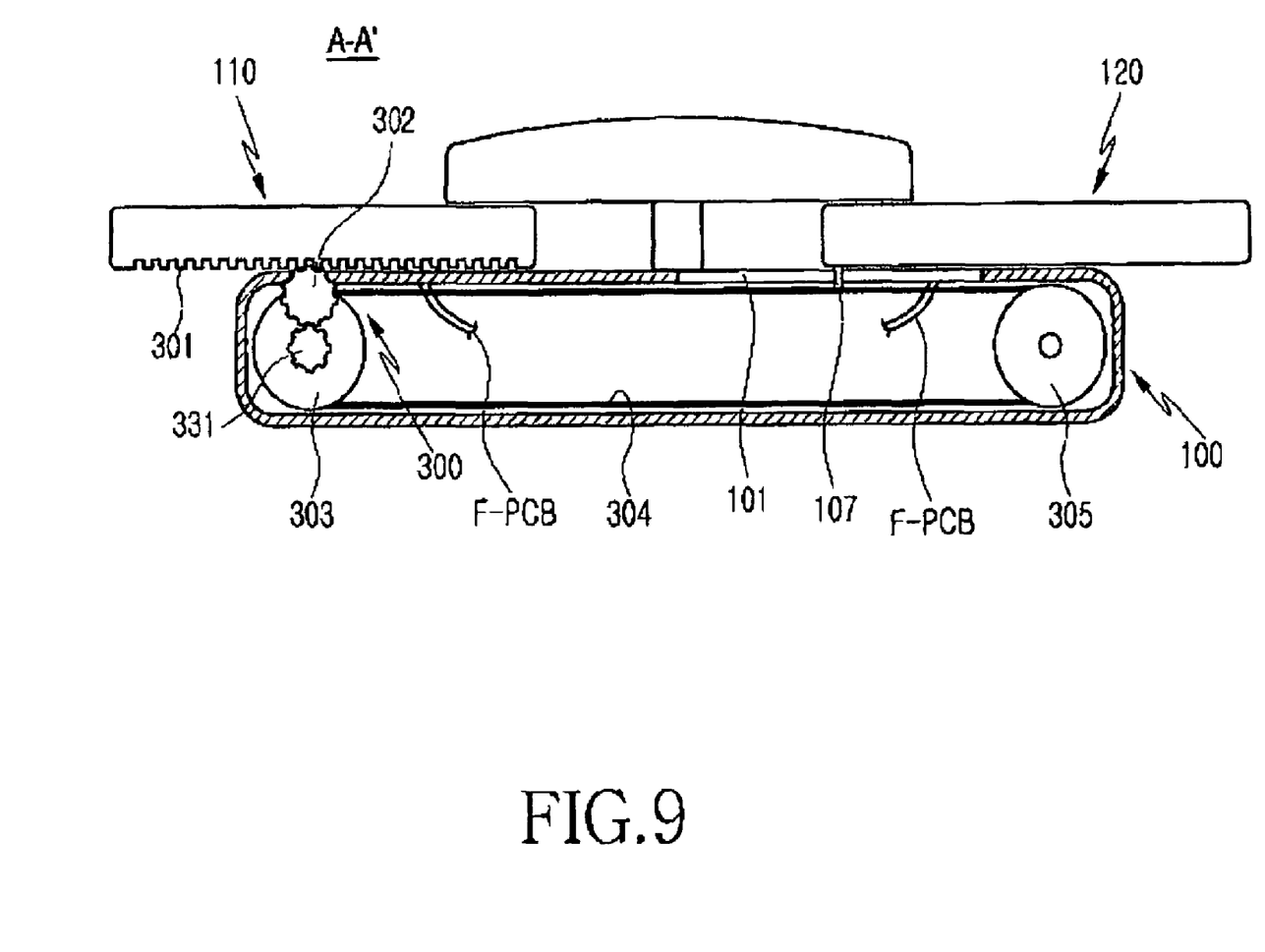
FIG. 9 is a cross-sectional view of the portable digital communication apparatus shown in FIG. 4 taken along line A-A'.

The driving means 300 includes a rack gear 301, a pinion gear 302, a driving pulley 303, a driving belt 304, and a driven pulley 305.

The rack gear 301 is positioned on the rear surface of the first key housing 110 along its longitudinal direction and is adapted to rotate the pinion gear 302 to slide the first key housing 110 according to a rotation of the pinion gear 302.

The pinion gear 302 is rotatably positioned in the main housing 100 adjacent to an end portion thereof. A portion of the pinion gear 302 protrudes out of the upper surface of the main housing 100 to engage the rack gear 301.

The driving pulley 303 is rotatably positioned in the main housing 100 adjacent to an end portion thereof and is provided with, on its end, a driven gear 331 which is adapted to engage and rotate with the pinion gear 302.

The driven pulley 305 is rotatably positioned in the main housing 100 adjacent to the other end portion thereof and is adapted to be rotated by the driving belt 304 while being interlocked with the driving pulley 303.

The driving belt 304 is adapted to transform a rotational movement of the driving pulley 303 into a linear movement and transmit it to the second key housing 120, which is connected with the driving belt 304 for linear movement. Specifically, the second key housing 120 is provided with, on its end, an interlocking pin 107 to interlock with the driving belt 304. This causes the second key housing 120 to be moved according to a movement of the driving belt 304. It will be obvious to those skilled in the art that, since the interlocking pin 107 is adapted to travel linearly according to a movement of the driving belt 304, the main housing 100 is provided with a corresponding opening.

To be more specific, the operation of the driving means 300 is as follows: if a user slides the first key housing 110, the linear movement of the rack gear 301 is transformed into a rotational movement of the pinion gear 302. The rotational movement of the pinion gear 302 is transmitted via the driven gear 331 to rotate the driving pulley 303. This rotation results in a linear movement of the driving belt 304, which is transmitted via the interlocking pin 107 and slides the second key housing 120.

Because of the driven gear 331, the rotation direction of the driving pulley 303 is opposite from that of the pinion gear 302. Accordingly, the first and second key housings 110, 120 slide toward or away from each other.

It will be easily understood to those skilled in the art that, if a user slides the second key housing 120, the first key housing 110 slides accordingly as the driving means 300, including the driving belt 304, is operated by the interlocking pin 107.

Consequently, if a user chooses one of the first and second key housings 110 and 120 and slides it, the other key housing is slid accordingly by means of the driving means 300.

As described above, the sliding/swing-type portable digital communication apparatus according to the present invention guarantees quickness, correctness, and convenience in key operations, in particular in key pressing, using both hands. In addition, the apparatus has an advantage in that its camera lens, mirror, and speaker unit are protected from the outside and smooth sliding movements of its key housings are obtained. Furthermore, the apparatus has a pair of key housings adapted to slide toward or away from each other while being interlocked with each other and thus is convenient to use.

While the invention has been shown and described with reference to certain preferred embodiments thereof, it will be understood by those skilled in the art that various changes in form and details may be made therein without departing from the spirit and scope of the invention as defined by the appended claims. For example, the key housings may slide independent of each other, or simultaneously through the provision of the driving means. In addition, the driving means may be manually operated, as described above, or may include a motor for automatic operation.

What is claimed is:

1. A sliding/swing-type portable digital communication apparatus comprising:
    a main housing having a speaker unit positioned on a rear surface of the main housing;
    two key housings, each of which is positioned on a side of the main housing, and being slidable on a slide plane a first predetermined distance and a second predetermined distance toward or away from the main housing along a longitudinal direction of the main housing; and
    a swing housing which is hinged to the main housing, rotatable within a predetermined angle about a hinge axis perpendicular to the slide plane, and continuously facing an upper surface of the main housing and upper surfaces of the key housings;
    wherein, for increasingly exposing predetermined areas of the key housings, the key housings and the swing housing move with respect to the main housing in three sequential phases including firstly a first sliding of at least one of the key housings over the first predetermined distance, secondly a rotation of the swing housing over the predetermined angle, and thirdly a second sliding of at least one of the key housings over the second predetermined distance.

2. A sliding/swing-type portable digital communication apparatus as claimed in claim 1, wherein the key housings are provided with, on their upper surfaces, a first key array composed of a number of keys which are visually exposed after the first sliding; a second key array composed of a number of keys which are visually exposed after the rotation; and a third key array composed of a number of keys which are visually exposed after the second sliding.

3. A sliding/swing-type portable digital communication apparatus as claimed in claim 2, wherein the second key array is disposed between the first key array and the third key array, and the first, second, and third key arrays are arranged on the upper surfaces of the key housings.

4. A sliding/swing-type portable digital communication apparatus as claimed in claim 3, wherein the number of keys composing the second key array is greater than the number of keys composing the first key array, and is less than the number of keys composing the third key array.

5. A sliding/swing-type portable digital communication apparatus as claimed in claim 1, wherein each of the key housings is positioned on each of opposite sides of the main housing and is slidable toward or away from each other.

6. A sliding/swing-type portable digital communication apparatus as claimed in claim 1, wherein the key housings are positioned symmetrically with respect to each other and with respect to the main housing.

7. A sliding/swing-type portable digital communication apparatus as claimed in claim 1, wherein the swing housing after rotating 90° is adjacent to the upper surfaces of the key housings in a cross-shaped configuration.

8. A sliding/swing-type portable digital communication apparatus as claimed in claim 1, wherein the swing housing is provided with, on an upper surface of the swing housing, a display unit and a fourth key array composed of a number of keys disposed adjacent to the display unit.

9. A sliding/swing-type portable digital communication apparatus as claimed in claim 1, wherein at least one of the key housings is provided with, on a rear surface of the at least one key housing, one or more openings for the speaker unit.

10. A sliding/swing-type portable digital communication apparatus as claimed in claim 9, wherein the openings on the key housings face the speaker unit when the key housings are closed on the main housing.

11. A sliding/swing-type portable digital communication apparatus comprising:
    a main housing including a battery pack positioned on a lower surface of the main housing, a camera lens positioned adjacent to a side of the battery pack, and a locking knob positioned adjacent to an other side of the battery pack;
    two key housings, each of which is positioned on each of opposite sides of the main housing and being slidable on a slide plane a first predetermined distance and a second predetermined distance toward or away from the main housing along a longitudinal direction of the main housing; and a swing housing which is hinged to the main housing, rotatable within a predetermined angle about a hinge axis, perpendicular to the slide plane and, continuously facing an upper surface of the main housing and upper surfaces of the key housings;

wherein, for increasingly exposing predetermined areas of the key housings, the key housings and the swing housing move with respect to the main housing in three sequential phases including firstly a first sliding of at least one of the key housings over the first predetermined distance, secondly a rotation of the swing housing over the predetermined angle, and thirdly a second sliding of at least one of the key housings over the second predetermined distance.

12. A sliding/swing-type portable digital communication apparatus as claimed in claim 11, wherein the key housings are provided with, on their upper surfaces, a first key array composed of a number of keys which are visually exposed after the first sliding; a second key array composed of a number of keys which are visually exposed after the rotation; and a third key array composed of a number of keys which are visually exposed after the second sliding.

13. A sliding/swing-type portable digital communication apparatus as claimed in claim 12, wherein the second key array disposed between the first key array and the third key array, and the first, second, and third key arrays are arranged on the upper surfaces of the key housings.

14. A sliding/swing-type portable digital communication apparatus as claimed in claim 13, wherein the number of keys composing the second key array is greater than the number of keys composing the first key array, and is less than the number of keys composing the third key array.

15. A sliding/swing-type portable digital communication apparatus as claimed in claim 11, wherein the key housings are positioned symmetrically with respect to each other and with respect to the main housing.

16. A sliding/swing-type portable digital communication apparatus as claimed in claim 11, wherein the swing housing after rotating 90° is adjacent to the upper surfaces of the key housings in a cross-shaped configuration.

17. A sliding/swing-type portable digital communication apparatus as claimed in claim 11, wherein the swing housing is provided with, on an upper surface of the swing housing, a display unit and a fourth key array composed of a number of keys disposed adjacent to the display unit.

18. A sliding/swing-type portable digital communication apparatus comprising:
a main housing having a battery pack positioned on a lower surface of the main housing;
two key housings, each of which is positioned on each of opposite sides of the main housing and slidable on a slide plane a first predetermined distance and a second predetermined distance toward or away from the main housing along a longitudinal direction of the main housing;
a swing housing which is hinged to the main housing, rotatable within a predetermined angle about a hinge axis, perpendicular to the slide plane and continuously facing an upper surface of the main housing and upper surfaces of the key housings; and
a set of key arrays provided on the upper surfaces of the key housings, the key arrays being increasingly exposed upon a sequential movement of the key housings and the swing housing with respect to the main housing,
wherein the set of key arrays comprises a first key array composed of a number of keys visually exposed after a first sliding of the key housings over the first predetermined distance; a second key array composed of a number of keys visually exposed after a rotation of the swing housing over the predetermined angle; and a third key array composed of a number of keys visually exposed after a second sliding of the key housings over the second predetermined distance.

19. A sliding/swing-type portable digital communication apparatus as claimed in claim 18, wherein the swing housing is provided with, on an upper surface of the swing housing, a display unit and a fourth key array composed of a number of keys disposed adjacent to the display unit.

20. A sliding/swing-type portable digital communication apparatus as claimed in claim 19, wherein, firstly after the first sliding, the first key array, the display unit, and the fourth key array are disposed adjacent to one another; secondly after the rotation the second key array is disposed adjacent to and between the first key array and the display unit; and, thirdly after the second sliding the second key array is disposed adjacent to and between the first and third key arrays, and the third key array and the display unit are disposed adjacent to each other.

21. A sliding/swing-type portable digital communication apparatus as claimed in claim 19, wherein the number of keys composing the second key array is greater than the number of keys composing the first key array, and is less than the number of keys composing the third key array.

22. A sliding/swing-type portable digital communication apparatus as claimed in claim 18, wherein the key housings are provided with holding means for sliding the key housings along edges of the battery pack.

* * * * *